United States Patent [19]

Philipp

[11] 4,125,386
[45] Nov. 14, 1978

[54] HANDLE CONSTRUCTION FOR FILTER FRAME

[75] Inventor: Emmett J. Philipp, Brookfield, Wis.

[73] Assignee: Air Filter Corporation, Milwaukee, Wis.

[21] Appl. No.: 823,841

[22] Filed: Aug. 11, 1977

[51] Int. Cl.² .............................................. B65B 61/00
[52] U.S. Cl. ............................. 55/493; 55/DIG. 31; 220/94 R; 16/126
[58] Field of Search ................... 55/DIG. 31, 36, 493; 210/470, 471; 16/126; 126/190, 194, 198; 220/94 R; 190/58 R

[56] References Cited

U.S. PATENT DOCUMENTS

| | | | |
|---|---|---|---|
| 2,338,082 | 1/1944 | Brewton | 220/94 R |
| 2,513,716 | 7/1950 | Farr | 55/493 |
| 2,771,154 | 11/1956 | Gonzalez | 55/DIG. 31 |
| 3,261,053 | 7/1966 | Lesher | 16/126 |
| 3,280,984 | 10/1966 | Sexton et al. | 55/493 |
| 3,774,377 | 11/1973 | Bishop | 55/493 |

*Primary Examiner*—William A. Cuchlinski, Jr.
*Assistant Examiner*—Jon E. Hokanson

[57] ABSTRACT

A rectangular or square metallic frame defines an interior filter medium area. The structural frame member, or members, are channel-shaped in cross section with the channel opening toward the filter medium area. A slot is cut into one of the legs of the channel frame member at the juncture between that leg and the web of the channel, the slot being in general alignment with the interior surface of the channel web. A generally planar handle anchor plate extends through the slot and makes face to face contact with the interior surface of the channel web. A portion of the anchor plate protrudes laterally from the slot and pivotally carries a hand grip. The anchor plate is spot welded to the channel web.

5 Claims, 3 Drawing Figures

HANDLE CONSTRUCTION FOR FILTER FRAME

BACKGROUND OF THE INVENTION

This invention relates to filter constructions and, more particularly, to the type of filter which is intended to be cleaned and reused and, even more particularly, to the handle construction for that type of filter.

There are a class of filters which are not intended to be expendable and wherein it is contemplated that the filter medium can be cleaned for reuse rather than disposing of the contaminated filter and replacement with a new filter. An example of that class of filter are grease filters which incorporate a metallic filter medium of one of several accepted configurations. These reusable filters are subjected to rather rough treatment during cleaning and the most prevalent source of failure is in the handle provided to permit easy manipulation of the filter for removal, cleaning and replacement. These handles are susceptible to being torn from the filter frame during the cleaning operation.

This invention is concerned with this problem of damage to the filter handle and has among its objects to provide a secure method of attaching the handle to the filter frame to minimize the possibility of the handle becoming separated from the frame.

SUMMARY OF THE INVENTION

For the achievement of that and other objects, this invention proposes a frame construction wherein the peripheral frame of the filter includes a generally planar web portion. The web portion has an interior surface which faces toward the filter medium area defined by the peripheral frame. A handle assembly including a generally planar handle anchor plate and a handle grip pivoted to the anchor plate is attached to the filter frame to permit manipulation of the filter assembly. The handle anchor plate is attached to the filter frame with face to face engagement between the anchor plate and the interior facing surface of the filter frame. The anchor plate also has a limited lateral projection from the filter frame and the handle grip is pivotally supported in that projection for ready manipulation of the filter assembly.

Preferably, the filter frame is generally channel-shaped in cross section, the web of the channel providing the planar, interior facing surface referred to above. A slot is cut in one of the legs of the channel in the area of the joint between that leg and the channel web, the slot being generally in alignment with the interior surface of the channel web. The anchor plate extends through the slot and along a substantial portion of the interior facing surface of the web channel.

Other objects and advantages will be pointed out in, or be apparent from, the specification and claims, as will obvious modifications of the embodiment shown in the drawings.

DESCRIPTION OF THE PREFERRED EMBODIMENT

Figure 1:
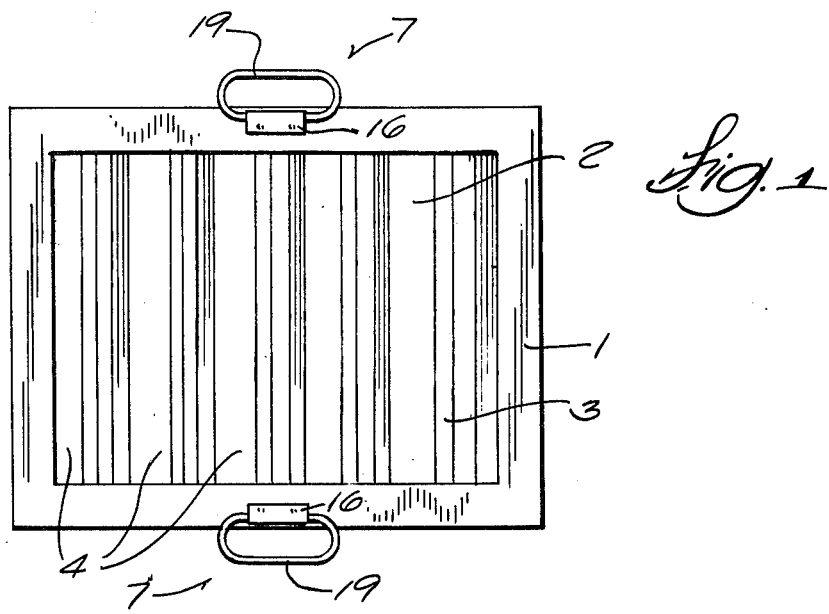
FIG. 1 is a front elevation of a filter incorporating a handle embodying this invention.

The filter assembly illustrated in FIG. 1 of the drawings includes a peripheral generally rectangular or square frame 1 which defines an interior filter medium area 2. This invention will perhaps find its widest application in connection with metallic filters of the type utilized to separate grease and the like from a flowing airstream and it will be discussed in that environment, but it should be noted that it is not necessarily so limited.

In such an environment, the filter frame is metallic made from, for example. rolled galvanized metal or stainless steel. A metallic filter medium 3 is generally supported within the medium area, as illustrated this consists of overlapping metal plates 4. As stated previously, the filter medium can take on other configurations, such as multiple layers of metallic expanded metal and woven wire.

A typical application for these grease filters is to locate them in the exhaust stream provided over a restaurant cooking grille, or similar appliance, which generates airborne grease in the exhaust stream. The filter medium catches the grease while permitting pass-through of the airflow. Periodically, it is necessary to clean the filter medium for safety reasons as well as efficiency of the filtering operation.

To clean the filters, they are removed from the exhaust stream and hosed down with water or washed in a suitable chemical cleansing solution. To facilitate removal, cleaning and replacement, a handle construction 7 is usually provided on the filter frame and there is a tendency on the part of those doing the cleaning to handle the grease filter quite roughly by the handle, in some cases swinging the filter against a rigid object such as a wall, pole or the like to shake the grease loose. As a consequence of such rough usage, the handle, or handles, can be separated from the frame making it at least difficult to reuse the filter if not completely destroying the reusability of the assembly.

In accordance with this invention, handle assemblies are attached to the frame in a manner to minimize the danger of their being torn from the frame.

More particularly, the filter frame is generally channel-shaped in cross section, comprising a web 8 and spaced legs 9 and 11. The opening of the channel is directed inwardly toward the filter medium area 2 and the web has an interior surface 12 which faces towards that area.

A slot 13 is cut into one of the legs generally in the area between the joint of that leg and the web, more particularly, the slot is generally in alignment with the planar interior surface 12 of the web.

The handle comprises a generally planar anchor plate 14, a second anchor plate 16 and a hinged portion 17 integrally formed therein. The hinge portion is formed by upsetting a portion at the joint between the two plates. The hinge receives portion 18 of a rectangular handle grip 19 so that the overall handle is pivotable with respect to the anchor plates.

Figure 2:
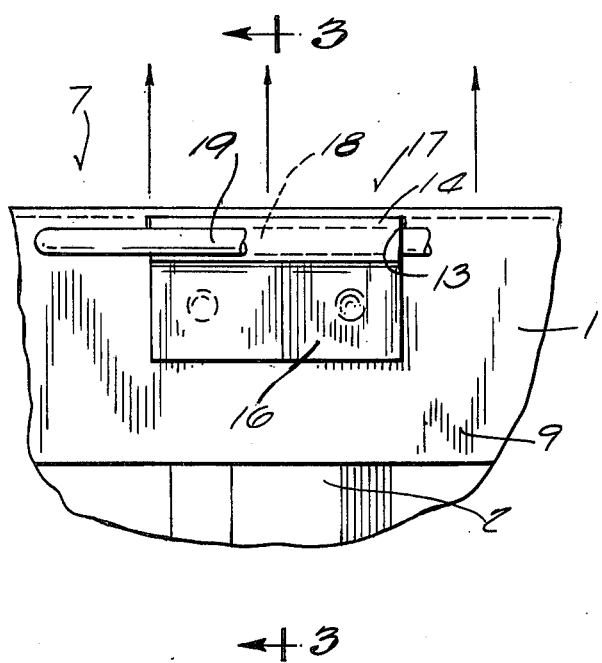
FIG. 2 is an enlarged view of the handle.
Figure 3:
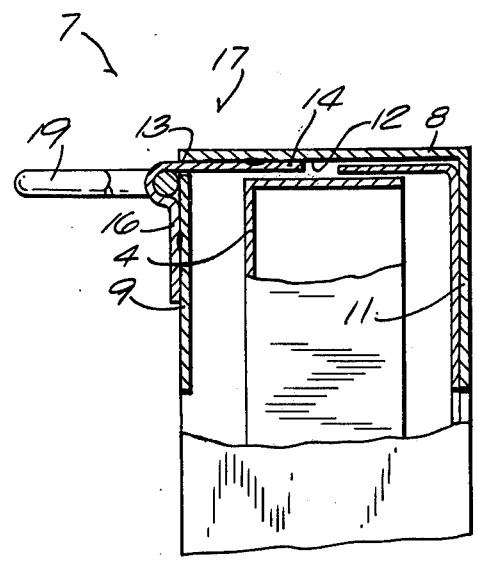
FIG. 3 is a section view taken along line 3—3 of FIG. 2.

Planar anchor plate 14 extends into the slot and makes face to face engagement with the interior surface of the web. The hinge portion 17 of the anchor plate projects laterally of the filter frame so that the handle can be readily manipulated through approximately 180° of motion. The anchor plate 14 is spot welded to the interior surface 12 when so positioned, and plate 16 is spot welded to the outside of leg 9. With this arrangement, when the handle is grasped and the filter assembly manipulated by the handle, the forces which are generally applied to the anchor plate 14 are generally in a direction of the arrows in FIG. 2 which is away from the interior filter medium area 2. With the anchor plate 14 so positioned, i.e. along the interior surface of the web, as opposed along the exterior surface thereof, these forces press the anchor plate 14 against the web 8 as opposed to tending to separate them if the plate was along the exterior surface. Thus, the tendency for the anchor plate 14 to separate from the filter frame 1 is reduced to an absolute minimum. The forces on plate 16 are not as much a problem and it can be attached to exterior surface.

Although but one embodiment of the present invention has been illustrated and described, it will be apparent to those skilled in the art that various changes and modifications may be made therein without departing from the spirit of the invention or from the scope of the appended claims.

I claim:

1. A filter frame and handle construction comprising, in combination, a peripheral filter frame extending around and defining an interior filter medium area, said peripheral filter frame including an interior facing surface facing inwardly toward said interior filter medium area, a filter medium located within said interior filter medium area and the periphery of said filter medium generally confined therein by said peripheral filter frame, said peripheral filter frame being generally channel shaped in cross section and having a web separating two oppositely spaced legs extending from said web, said oppositely spaced legs projecting inwardly toward said filter medium area so that the opening of said channel shaped filter frame is similarly inwardly directed and said web defines said interior facing surface, and a handle assembly attached to said peripheral filter frame and including means defining a slot passing through one of said legs and in general alignment with said interior facing surface, an anchor plate extending through said slot over and in face to face engagement with a portion of said interior facing surface of said peripheral filter frame and including a hinge portion projecting laterally from said slot, a handle grip engaged in said hinge portion of said anchor plate whereby it is connected to said anchor plate but is pivotal relative to said anchor plate and said peripheral filter frame, and means for attaching said anchor plate to said interior facing surface in face to face engagement therewith.

2. The filter frame and handle assembly of claim 1 wherein said anchor plate is spot welded to said interior facing surface.

3. The filter frame and handle assembly of claim 1 wherein said handle includes a second anchor plate at right angles to said first mentioned anchor plate and connected to said one channel leg.

4. The filter frame and handle assembly of claim 1 wherein said interior facing surface and said anchor plate are generally planar.

5. A filter frame and handle construction comprising, in combination, an integral frame member defined by adjoining side panels, said side panels including an outer surface area defining an outer perimeter of said frame member and an inner surface area coextensive with said outer surface area and defining an inner perimeter of said frame member, said inner perimeter extending peripherally around and defining an interior filter medium area, a filter medium located within said interior filter medium area, said filter medium having an outer perimeter surface area facing said inner perimeter of said frame member, and a handle assembly attached to said frame member, said handle assembly characterized in that said handle assembly includes an anchor plate located intermediate said outer perimeter surface area of said filter medium and said inner perimeter of said frame member, said anchor plate extending over and in face to face engagement with a portion of said inner perimeter and including a hinge portion projecting laterally outwardly of said frame member, a handle grip engaged in said hinge portion whereby said handle grip is connected to said anchor plate but is pivotal relative to said anchor plate and said frame member, and means attaching said anchor plate to said inner perimeter of said frame member in face to face engagement therewith.

* * * * *